United States Patent Office 3,793,352
Patented Feb. 19, 1974

3,793,352
POLYAMIDE AMMONIUM COMPOUNDS, THEIR PRODUCTION AND USE
Richard Hochreuter, Basel, Switzerland, assignor to Sandoz Ltd. (also known as Sandoz AG), Basel, Switzerland
No Drawing. Filed Oct. 4, 1971, Ser. No. 186,507
Claims priority, application Switzerland, Oct. 9, 1970, 14,902/70
Int. Cl. C07c *103/30*
U.S. Cl. 260—404.5    8 Claims

ABSTRACT OF THE DISCLOSURE

New polyamide-ammonium compounds for the antistatic, bacteriostatic and/or fungistatic finishing of high polymers.

---

This invention relates to a class of new polyamide ammonium compounds of formula

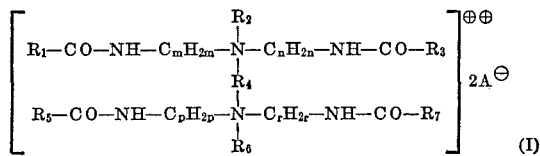

where
$R_1$, $R_3$, $R_5$ and $R_7$ each stands for a higher aliphatic radical with, e.g. 9 to 30 carbon atoms, which may be substituted,
$R_2$ and $R_6$ each stands for a lower aliphatic radical with, e.g. 1 to 8 carbon atoms, which may be substituted, such as a polyglycolether radical containing preferably 1 to 40 ethylenoxy, propylenoxy or butylenoxy groups, a radical containing HO—, $H_2N$—CO, NC— or MOOC— groups where M represents a hydrogen or alkali-metal atom, an equivalent of an alkaline-earth metal or a lower alkyl radical,
$R_4$ for a divalent radical which contains in all 2 to 18 carbon atoms and may be interrupted by hetero atoms and/or aromatic rings, preferably benzene rings, an alkylene group which may be interrupted by oxygen atoms or an aralkylene group which contains 8 to 14 carbon atoms and may be interrupted by oxygen atoms or sulphonyl groups,
$A^\ominus$ for an equivalent of an anion, preferably a halogen, methyl sulphate, nitrate, formate or acetate anion, or the anion of an optionally substituted benzenesulphonic acid, the phenol radical of a chloro-substituted phenol compound, the radical of a brominated salicylic anilide or the equivalent of a sulphate or phosphate radical, and
$m$, $n$, $p$ and $r$ each stands for a whole number from 2 to 6.

It is preferable for $R_1$, $R_3$, $R_5$ and $R_7$ to have the same meaning, $R_2$ and $R_6$ the same meaning and $m$, $n$, $p$ and $r$ the same meaning.

This invention relates further to a process for the production of the compounds of Formula I which is characterized by the quaternation of (a) 1 mol of a compound of formula

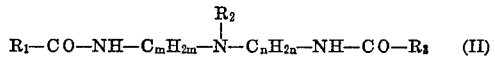

and 1 mol of a compound of formula

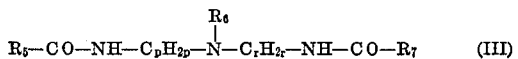

with a bifunctional alkylating agent, or of (b) 1 mol of a compound of formula

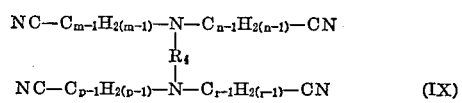

with a monofunctional alkylating agent, with subsequent replacement of the anion introduced by quaternation by another anion if necessary.

The compounds of Formulae II and III can be produced by known methods, for example by acylation of the corresponding dialkylene triamines with higher aliphatic carboxylic acids or their functional derivatives (anhydrides, halides, salts) and subsequent monoalkylation by one of the known methods with one of the commonly used monofunctional alkylating agents or by reductive methylation using formaldehyde and formic acid or by the addition of epoxides or $\alpha,\beta$-unsaturated compounds. If the radical introduced by alkylation contains mobile hydrogen atoms it can be reacted further with epoxides or $\alpha,\beta$-unsaturated compounds.

Another method of obtaining amides of Formula II or III is to acylate N-alkylamines of formula

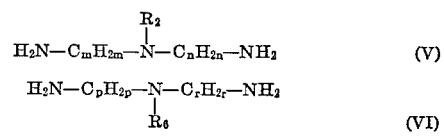

and, if the radicals $R_2$ and $R_6$ contain mobile H atoms, to react these further with epoxides or $\alpha,\beta$-unsaturated compounds.

Quaternation of the compounds of Formulae II and III to compounds of Formula I is also carried out by one of the known methods, for example by alkylation with a compound of formula $$X-R_4-X \qquad (VII)$$

where $R_4$ has the aforestated meaning and X stands for the radical of a strong acid, e.g. a group of formula $\varphi$—$SO_2$—O— where $\varphi$ denotes an unsubstituted or substituted alkyl or aryl radical, or by alkylation with activated divinyl compounds or diepoxides. The following anion may be named to exemplify $X^\ominus$: halides such as chloride, bromide, iodide, further sulphate, disulphate, methylsulphate, aminosulphonate, perchlorate, phosphate, benzosulphonate, naphthalenesulphonate, 4-chlorobenzenesulphonate, 4-methylbenzenesulphonate and methanesulphonate. The anion in the resulting compounds can be replaced by another anion $A^\ominus$, for instance with the aid of an ion exchanger or by reaction with a salt or acid, if desired, in more than one stage, e.g. via the hydroxide.

The compounds of Formula IV can be produced in analogy with the known methods, for example by alkylation of diamines of formula $$H_2N-R_4-NH_2 \qquad (VIII)$$

to nitriles of formula

reduction of the nitriles and subsequent acylation. The alkylation step with monofunctional alkylating agents is carried out by one of the known methods.

The dialkylene triamines may be symmetrical or asymmetrical but the symmetrical compounds are preferred, for example diethylene triamine, dipropylene triamine, dibutylene triamine and dipentylene triamine. Examples of compounds of Formula V or VI are bis-(2-aminoethyl) - methylamine, bis-(3-aminopropyl)-methylamine, bis-(2-aminoethyl)-ethylamine, bis - (2 - aminoethyl) - hydroxyethylamine, bis-(3-aminopropyl)-ethylamine and bis-(3-aminopropyl)-hydroxyethylamine. Of the aforenamed, preference is given to dipropylene triamine, bis-(3-aminopropyl)-methylamine and bis-(2-aminoethyl)-methylamine.

The acylation reaction is carried out preferably with the use of free carboxylic acids by heating at high temperatures, preferably 120–210° C., with dehydration. Optimally 1.7 to 2.3 mols, preferably 2 mols, of carboxylic acid per mol of dialkylene triamine are used.

The carboxylic acids may be saturated or unsaturated, natural or synthetic fatty acids, preferably with a straight chain. The following may be named as examples: capric, lauric, myristic, palmitic, stearic, cocinic, linoleic, oleic, tallow fat acid, sperm oil fat acid, behenic acid and similar acds.

The condensation products of the triamine fatty acids are alkylated preferably by reaction with the calculated amount of alkylating agent at about 30–100° C. Specially suitable alkylating agents are the alkylesters of inorganic acids, for example dialkyl sulphates such as dimethyl sulphate, alkyl halides such as methyl and ethyl chloride, bromide and iodide, the ethyl esters and sodium salts of chloracetic and chlorpropionic acid. The alternative methods which may be mentioned are reductive alkylation or methylation by means of formaldehyde/formic acid which is carried out at high temperature, e.g. 50–120° C., and the addition of epoxides such as ethylene, propylene or butylene oxide and of $\alpha,\beta$-unsaturated compounds such as acrylamide, acrylonitrile and acrylic acid, ester, which are reacted with the amine at about 70–140° C.

The following may be named to exemplify the bifunctional alkylating agents which are suitable for quaternating the tertiary aminoamides: bis-(chloromethyl)-ether, 2,2'-dichlorodiethylether, 4,4'-dichlorodibutylether, 1,4-dichloro-2-butene, 1,4-dichloro-2-butine, 1,4-dichlorobutane, 1,10-dichlorodecane, 4,4' - bis - (chloromethyl) - diphenylether, 4,4' - bis - (chloromethyl)-diphenylsulphone, 1,4-bis-(chloromethyl)-benzene, the corresponding bromine and iodine derivatives, dichlorohydrin ethers, e.g. the reaction products of polyglycol ethers, ethylene glycol or 4,4'-dioxydiphenyl dimethylmethane with 2 mols of epichloro hydrin, the corresponding diepoxides, and activated divinyl compounds such as divinyl sulphone and bis-(acrylamino)-methane. The divinyl and diepoxy compounds are employed in the presence of hydrogen halide, for example hydrochloric acid.

The diquaternary compounds are produced in an essentially similar manner to the monoquaternary compounds.

Generally 2 mols of the tertiary aminoamide and 1 mol or an excess of a difunctional alkylating agent are reacted in the temperature range of about 60° to 140° C. in the presence or absence of solvent until the product is soluble or finely dispersible in water. If quaternated esters are formed they can be converted into betain-like compounds by hydrolysis. The quaternary salts can be easily converted, either wholly or partly, into the corresponding quaternary chlorophenolates, for example by the addition of an aqueous solution of the sodium salt of pentachlorophenol or methylene bischlorophenol, on which products are formed which besides softening properties have pronounced microbicidal action.

The new quaternation products as defined in this invention are obtained in the form of pale brown to brownish, usually wax-like solids which as a rule are readily dispersible in water.

The products can be marketed and used as obtained or in the form of aqueous pastes or dispersions or as solutions in an organic solvent. They are applicable by padding, exhaustion, spraying, coating and other standard methods on natural, regenerated and synthetic fibres such as wool, silk, cellulosic fibres, polyamide, polyester, polyacrylonitrile, acrylonitrile copolymer, polyurethane, polyolefin and basic, acid modified and metallized polyolefin fibres.

The fibres may be present in the form of loose fibre, filaments, yarns, nonwovens, felts, carpets, woven or knitted fabrics. Other suitable substrates for the products are paper, furs, leather and plastics. They can if desired be incorporated in synthetic fibres such as polyamides and in plastics such as polyolefins and polyvinyl chloride prior to spinning or moulding.

The products disclosed herein are employable on the aforenamed substrates, and this forms a further part of the subject matter of this invention, as antistatic agents, as microbiocides, in particular as bacteriostatic and fungistatic agents, resp. combined bactericidal-antistatic and fungicidal-antistatic agents, as dyeing assistants, and in particular as highly effective softening agents for natural and synthetic fibres and paper.

With their high substantivity the compounds are very suitable for use as softening agents in rinsing, for which purpose they are added to the last rinsing water in amounts of about 0.01 to 1 weight percent relative to the fibre weight.

The compounds of formula

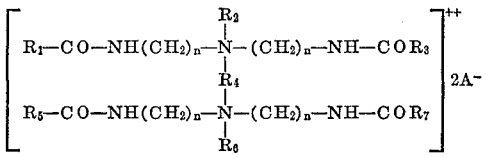

where $R_1$, $R_3$, $R_5$ and $R_7$ each stands for a higher aliphatic radical with 9 to 21 carbon atoms, $R_2$ and $R_6$ each for a lower radical with 1 to 3 carbon atoms, $R_4$ for a divalent radical containing 2 to 10 carbon atoms which may be interrupted by hetero atoms or by a benzene ring, $A^\ominus$ for a halogen anion or the radical of a chlorophenol and $n$ for 2 or 3, are especially suitable for use as antistatic agents, microbiocides or dyeing assistants, and are excellent softening agents for natural and synthetic fibres and paper.

Compounds of formula

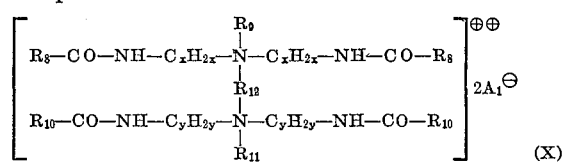

(X)

besides being good softeners, are highly suitable for antistatic finishing. In this formula $R_8$ and $R_{10}$ each stands for a higher alkyl radical having 9 to 18 carbon atoms, $R_9$ and $R_{11}$ each stands for a lower alkyl, aralkyl, carboxyalkyl or polyglycolether radical, $R_{12}$ for a polyglycolether radical or a lower alkylene radical, $A_1^\ominus$ for a halogen atom, a methylsulphate, sulphonate, vinyl sulphonate, nitrate or acetate radical or the equivalent of a sulphate, phosphate, borate, sulphite or oxalate radical, and $x$ and $y$ each stands for a whole number from 2 to 6. The preferred compounds of Formula X are those in which $R_9$ and $R_{11}$ each represents an alkyl radical having 1 to 3 carbon atoms, $R_{12}$ a divalent radical having 2 to 10 carbon atoms which may be interrupted by hetero atoms or a benzene ring, $x$ and $y$ represent 2 or 3 and $A^\ominus$ a halogen atom or the radical of a chlorophenol.

Compounds of formula

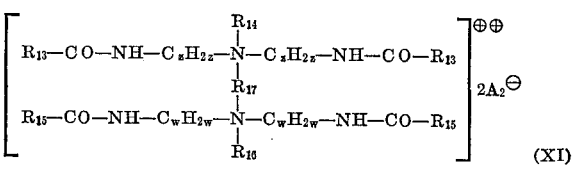

(XI)

in addition to their use as softeners, are very suitable for microbicidal finishing, in which they show pronounced bacteriostatic and fungistatic action. In this formula $R_{13}$ and $R_{15}$ each stands for an alkyl radical having 9 to 17 carbon atoms, $R_{14}$ and $R_{16}$ each stands for a lower alkyl, aralkyl, carboxyalkyl or polyglycolether radical, $R_{17}$ for an alkylene radical which has in all 2 to 18 carbon atoms and may be interrupted by benzene rings and/or hetero atoms, $A_2^\ominus$ for a halogen, methylsulphate, nitrate, formate, acetate or benzenesulphonate anion, the equivalent of a sulphate or phosphate anion and/or the phenol radical of a chloro-substituted phenol compound or the radical of a brominated salicylic anilide, and $z$ and $w$ each stands for a whole number from 2 to 6.

Compounds of Formula XI are preferred in which $R_{14}$ and $R_{16}$ each represents an alkyl radical having 1 to 3 carbon atoms, $R_{17}$ a divalent radical raving 2 to 10 carbon atoms which may be interrupted by hetero atoms or a benzene ring, $z$ and $w$ each represents 2 or 3 and $A^\ominus$ a halogen anion or the radical of a chlorophenol.

Compounds which, along with the aforementioned bacteriostatic and fungistatic action, have a very pronounced softening effect are of formula

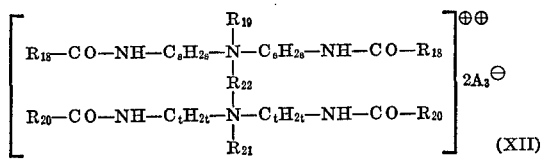

where $R_{18}$ and $R_{20}$ each stands for an alkyl radical having 12 to 30 carbon atoms, $R_{19}$ and $R_{21}$ each for a radical which contains 1 to 8 carbon atoms and may bear HO, $H_2N$—OC, NC or MOOC groups where M stands for a hydrogen atom, an alkali-metal atom or a lower alkyl radical, $R_{22}$ for an alkylene radical which contains in all 2 to 18 carbon atoms and may be interrupted by benzene rings and/or hetero atom, $A_3^\ominus$ for a halogen, methylsulphate, nitrate, formate or acetate anion, a benzenesulphonic acid anion which may be substituted, the phenol radical of a chloro-substituted phenol compound, the radical of a brominated salicylic anilide or the equivalent of a sulphate or phosphate radical, and $s$ and $t$ each stands for 2 to 6. Preference is given to compounds of Formula XII in which $R_{19}$ and $R_{21}$ stand for alkyl radicals having 1 to 3 carbon atoms, $R_{22}$ for a divalent radical which has 2 to 10 carbon atoms and may be interrupted by hetero atoms or a benzene ring, $s$ and $t$ stand for 2 or 3 and $A^\ominus$ for a halogen anion or the radical of a chlorophenol.

In contrast to the predominantly used softening agent, dimethyl-dihydrated stearic/seabacic-ammonium chloride, which is marketed in the form of a highly viscous aqueous dispersion containing 5–7% active substance, the products of this invention, prepared as aqueous dispersions of the same strength, have the important technical application advantages of appreciably lower viscosity, higher heat and frost stability and better salt stability. Moreover, on application to textile fabric in combination with optical brighteners the disclosed products do not yellow in drying as is often the case with dimethyl-dihydrated stearic ammonium chloride. The ammonium salts whose halogen atoms have been partly or completely replaced by, for example, a phenol radical or a chloro-substituted phenol, show considerably more powerful microbiocidal action than dimethyl-dihydrated stearic ammonium chloride, without their effectiveness as softening agents being thereby impaired.

In the following examples the parts and percentages are by weight and the temperatures in degrees centigrade.

The bactericidal (*Staphylococcus aureus* and *Escherichia coli*) and fungicidal (*Aspergillus niger*) action of the compounds of this invention was tested as follows. Cotton fabric was saturated with a 1% solution of the compound, expressed to 100% moisture content and dried at 30–40° C. Disks of 6 cm. diameter were punched out of the fabric, placed on agar slides injected with the test bacteria and the *Aspergillus niger* and incubated at 37° C., the bacterial cultures for 12–14 hours, the fungus culture for 40 hours. The inhibition zone in mm. was determined.

EXAMPLE 1

(a) 393 parts of dipropylene triamine are allowed to flow into 1620 parts of technical stearic acid at about 150°. The mixture is raised to 200° in 5 hours with the introduction of nitrogen, during which time 107 parts of water are distilled. After reacting for a further 3 hours with evacuation at 40 mm. mercurial pressure the acylation product reaches an acid number of 0.3. The mixture is allowed to cool to 100–110° and unloaded.

(b) 250 parts of the condensation product obtained as in (a) are melted at 90° and 30 parts of propylene oxide are dropped into the melt in 5 hours. After reaction for a further 5 hours at 90–95° the reflux disappears and the propylene oxide adduct is obtained as a hard, slightly brownish wax.

(c) 70 parts of the propylene oxide adduct produced as described above are heated to 150° and in 30 minutes 19 parts of 1,4-dichlorobutane are allowed to flow into the melt. The reaction mixture is stirred for 4 hours, then the excess dichlorobutane is distilled with vacuum. The quaternation product is obtained as a slightly brownish, wax-like mass which is finely dispersible in water. Applied to cotton from aqueous dispersion it imparts very good softening effects.

EXAMPLE 2

250 parts of the condensation product produced as in Example 1(a) and 28.5 parts of acrylamide are reacted for 6 hours at 120°, after which 14.3 parts of dichlorodiethylether are allowed to flow into the melt at 130°. After reaction for 5 hours the quaternation product is obtained as a slightly brownish melt which is finely dispersible in water. On textiles it produces similarly good softening effects to the product of Example 1.

EXAMPLE 3

(a) 313 parts of the acylation product obtained as in Example 1(a) are dissolved in 47 parts of hexylene glycol at 100° and 16.5 parts of paraformaldehyde are entered into the solution with stirring. When a clear solution has formed, 30 parts of 85% formic acid are dropped in. This leads to powerful development of carbon dioxide, which is complete after about 3 hours. The small remaining amount of excess formic acid is neutralized by adding 13 parts of 30% sodium hydroxide solution.

(b) At 108° 32 parts of 1,4-dichlorobutane are dropped into the methylation product obtained as above and the reaction mixture is stirred for 6 hours at this temperature. The diquaternary ammonium compound thus formed is a soft, slightly yellowish, wax-like mass which is finely dispersible in water and produces excellent softening effects.

(c) The methylation product obtained as in (a) can be produced by condensation of 270 parts of technical stearic acid with 72 parts of N,N-bis-(3-aminopropyl)-methylamine at 130–200° with distillation of about 18 parts of water.

Subsequently the quaternation reaction is carried out as given in (b). With regard to the softening effect, the resulting products are hardly distinguishable from those produced as in (a) to (b) above.

EXAMPLE 4

In 1 hour 150 parts of dichlorodiethyl ether are dropped at 110° into 273 parts of the tertiary amine produced as in Example 3(a) and the mixture is then stirred for 4 hours. Then the product is evacuated at about 40 mm. mercurial pressure and the excess dichlorodiethylether distilled. The quaternation product is obtained as a slightly brownish, soft wax, which forms opalescent solutions in water and gives very good softening effects on cellulosic, polyamide and polyester fibres.

EXAMPLE 5

250 parts of the acylation product obtained as in Example 1(a) are dissolved at 80° in 37.6 parts of isopropanol, and 13.2 parts of paraformaldehyde are entered into the solution. Then 24 parts of 85% formic acid are dropped in, on which marked carbon dioxide development sets in which is complete after about 5 hours. At this point the mixture is adjusted to a weakly alkaline reaction with 11 parts of 30% sodium hydroxide solution, 54.4 parts of 1,10-dibromodecane are added and the mixture stirred at about 80° for 3 hours. The resulting quaternation product is a soft, slightly brownish mass which is very finely dispersible in water.

EXAMPLE 6

The procedure of Example 5 is followed, with the difference that 25 parts of 1,4-dichlorobutane are employed for alkylation in place of 54.4 parts of 1,10-dibromodecane. The quaternation product thus obtained is a wax which is finely dispersible in water and produces very good softening effects on cotton.

EXAMPLE 7

When in the preceding Example 36 parts of p-xylene chloride are employed for quaternation in place of 25 parts of 1,4-dichlorobutane, a quaternation product with comparably good properties as a softening agent for textiles and paper is obtained.

EXAMPLE 8

(a) 540 parts of technical stearic acid are melted at about 90° and 103 parts of diethylene triamine are dropped into the melt at 140–150°. The reaction mixture is raised to about 200° with stirring while nitrogen is conducted into it and the water of reaction is continuously distilled. When 111 parts of condensed water have collected in the separator, the reaction mixture is evacuated at 40 mm. mercurial pressure until the product reaches an acid number of 2.4. It is then allowed to cool to about 110° and the acylation product unloaded.

(b) 295 parts of the condensation product are dissolved in 44 parts of iso-propanol. A solution of 18 parts of paraformaldehyde in 32.5 parts of 85% formic acid is allowed to flow into the solution at 80° with stirring. The initially heavy carbon dioxide development is complete after about 5 hours, on which the methylation product is rendered slightly alkaline with 13.4 parts of 30% sodium hydroxide solution.

(c) The methylation product is quaternated by the addition of 26 parts of dichlorodiethylether for about 3 hours at 80°. On cooling the final product solidifies to a pale, soft wax. It is soluble in water giving opalescent solutions and produces excellent softening effects.

EXAMPLE 9

Analogously to the procedure of Example 1(a), 682 parts of behenic acid are condensed with 131 parts of dipropylene triamine until the acid number of the reaction product is less than 1. 189 parts of the acylation product are dissolved in 28 parts of iso-propanol and methylated for about 7 hours at 80° with 8.25 parts of paraformaldehyde and 15 parts of 85% formic acid. Subsequently 6.7 parts of 30% sodium hydroxide solution are added and the amine quaternated by reaction with 18 parts of dichlorodiethylether for about 4 hours at 80°. The quaternary ammonium salt is obtained as a soft wax which is finely dispersible in water and gives very good softening effects on cotton.

EXAMPLE 10

A diacylation product is prepared from 282 parts of oleic acid and 65.5 parts of dipropylene triamine by the method described in Example 1(a).

It is dissolved in 48 parts of hexylene glycol at 100° and methylated by the addition of 16.5 parts of paraformaldehyde and 30 parts of formic acid. The methylation product is adjusted weakly alkaline with 13.3 parts of 30% sodium hydroxide solution and then quaternated with 32 parts of 1,4-dichlorobutane for 6 hours at 110°. The quaternation product is obtained as a slightly brownish viscous liquid which is finely dispersible in water. Besides having a pronounced softening effect it shows good antistatic and rewetting properties. Products with similar properties are obtained when in place of 282 parts of oleic acid 200 parts of lauric or 172 parts of capric acid are employed for condensation with 65.5 parts of dipropylene triamine, following in all other respects the procedure of this example.

EXAMPLE 11

82.5 parts of the quaternation product obtained according to Example 3 are melted at 95° and a solution of 14.5 parts of sodium pentachlorophenolate in 60 parts of water is stirred into the melt. The mixture is stirred thoroughly for 30 minutes and then gradually diluted with 200 parts of water. A product in paste form is obtained which gives stable aqueous dispersions and is eminently suitable for the simultaneous softening and microbicidal finishing of textiles.

EXAMPLE 12

The procedure of Example 11 is adopted, with the 14.5 parts of sodium pentachlorophenolate replaced by a solution of 10.8 parts of methylene bis-chlorophenol in 22.3 parts of 7.5% sodium hydroxide solution. After the addition of 3.5 parts of 15% formic acid and dilution with 200 parts of water a fine, pourable dispersion is obtained.

The product, like that of Example 11, is suitable for the combined softening and microbicidal finishing of textiles.

EXAMPLE 13

(a) Finishing of textile fabric 100 parts of cotton towelling fabric are washed at 95° in an automatic washing machine with a normal detergent based on alkylaryl sulphonate. Then 10 parts of a 1% solution of a softening agent as disclosed in this invention are added and the fabric is treated for 5 minutes at 10–20°. It is then hydroextracted and dried at 130°. Samples of the treated cotton towelling are stored for 24 hours at 22° and 65% relative humidity, after which they are tested and assessed for softness of handle by ten individuals.

Instead of being applied at room temperature, the softening agents of this invention can be added to warm baths, from which they are absorbed equally well by textile fabric. A cotton fabric, for instance, can be drawn about for 20 minutes in a bath at 40° containing 0.5 part of softening agent relative to 100 parts of fabric, liquor ratio 30:1. then expressed and dried for 5 minutes at 120°. Textiles of wool, polyamide, polyester and polyacrylonitrile fibres can be finished in the same way.

(b) Finishing of paper

The softening agents conforming to this invention are suitable for finishing paper, notably facial tissues and other soft grades. For this purpose they are dispersed in water and the dispersion added to the stock in the beater or at some other convenient point. Facial tissues finished in the stock with the disclosed agents have a full, soft touch and handle.

Having thus disclosed the invention what I claim is:
1. A compound of the formula

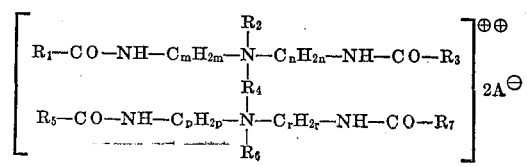

in which

R₁, R₃, R₅, and R₇ are each an aliphatic radical of 9 to 21 carbon atoms,

R₂ and R₆ are each an aliphatic radical of 1 to 3 carbon atoms which may be substituted by hydroxyl, aminocarbonyl, cyano, or —COOM wherein M is hydrogen, an alkali metal, an alkaline earth metal, or lower alkyl, R₄ is alkylene of 2 to 10 carbon atoms which may be interrupted by oxygen atoms or by a benzene ring, m, n, p, and r are each 2 or 3, and A⊖ is an equivalent of a halogen or mono-chlorophenol anion.

2. A compound according to claim 1 wherein R₂ and R₆ are alkyl.

3. A compound according to claim 1 wherein R₁, R₃, R₅, and R₇ are alkyl.

4. A compound according to claim 1 wherein R₁, R₃, R₅, and R₇ are the same; R₂ and R₆ are the same; and m, n, p, and r are the same.

5. A compound according to claim 1 of the formula

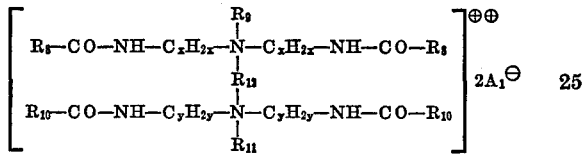

wherein

R₈ and R₁₀ are each an alkyl radical having 9 to 18 carbon atoms,

R₉ and R₁₁ are each an alkyl radical having 1 to 3 carbon atoms,

R₁₂ is an alkylene radical having 2 to 10 carbon atoms which may be interrupted by oxygen atoms or a benzene ring, x and y represent 2 or 3, and A⊖ is a halogen atom or the radical of a chlorophenol.

6. A compound of the formula

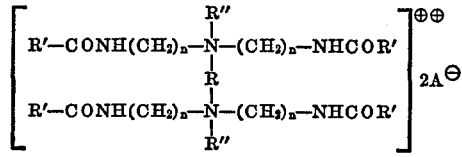

in which

R′ is C₁₇H₃₅, C₂₁H₄₃, C₁₁H₂₃, C₉H₁₉ or C₁₇H₃₃,

R″ is CH₂CH(OH)CH₃ or CH₃,

R is —(CH₂)₄—, —C₂H₄OC₂H₄—, —(CH₂)₁₀— or —CH₂—C₆H₄—CH₂—,

A⊖ is Cl⁻ or Br⁻, and n is 2 or 3.

7. The compound of formula

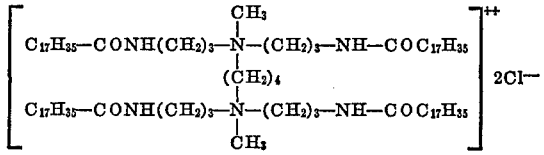

8. The compound of formula

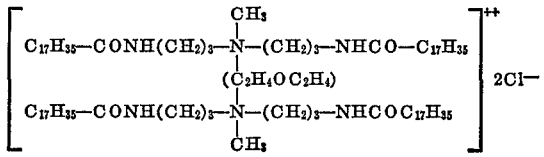

References Cited

UNITED STATES PATENTS

| | | | |
|---|---|---|---|
| 2,878,144 | 3/1959 | Conbere et al. | 260—404.5 X |
| 3,006,935 | 10/1961 | Albrecht | 260—404.5 |
| 3,027,387 | 3/1962 | Albrecht | 260—404.5 |
| 3,038,820 | 6/1962 | Albrecht | 260—404.5 X |
| 3,074,815 | 1/1963 | Lee et al. | 260—404.5 X |
| 3,492,324 | 1/1970 | Blackman | 260—404.5 |
| 3,555,056 | 1/1971 | Crescentini et al. | 260—404.5 |
| 3,577,447 | 1/1971 | Sweeney et al. | 260—404.5 |

FOREIGN PATENTS

| | | | |
|---|---|---|---|
| 985,109 | 3/1965 | Great Britain | 260—404.5 |

OTHER REFERENCES

Furukawa et al.: Chem. Abstracts, vol. 60, 8592h.
Chem. Abstracts, vol. 65, 20279d.
Chem. Abstracts, vol. 65, 7396h.

LEWIS GOTTS, Primary Examiner

E. G. LOVE, Assistant Examiner

U.S. Cl. X.R.

8—115.5; 117—138.5, 138.8 F, 138.8 N, 139.5 CQ; 162—161; 252—8.6, 8.8, 180; 260—465, 465.5; 424—320